Jan. 13, 1970   A. KARLSEN   3,489,458
ARMREST ASSEMBLY
Filed June 21, 1968   2 Sheets-Sheet 1
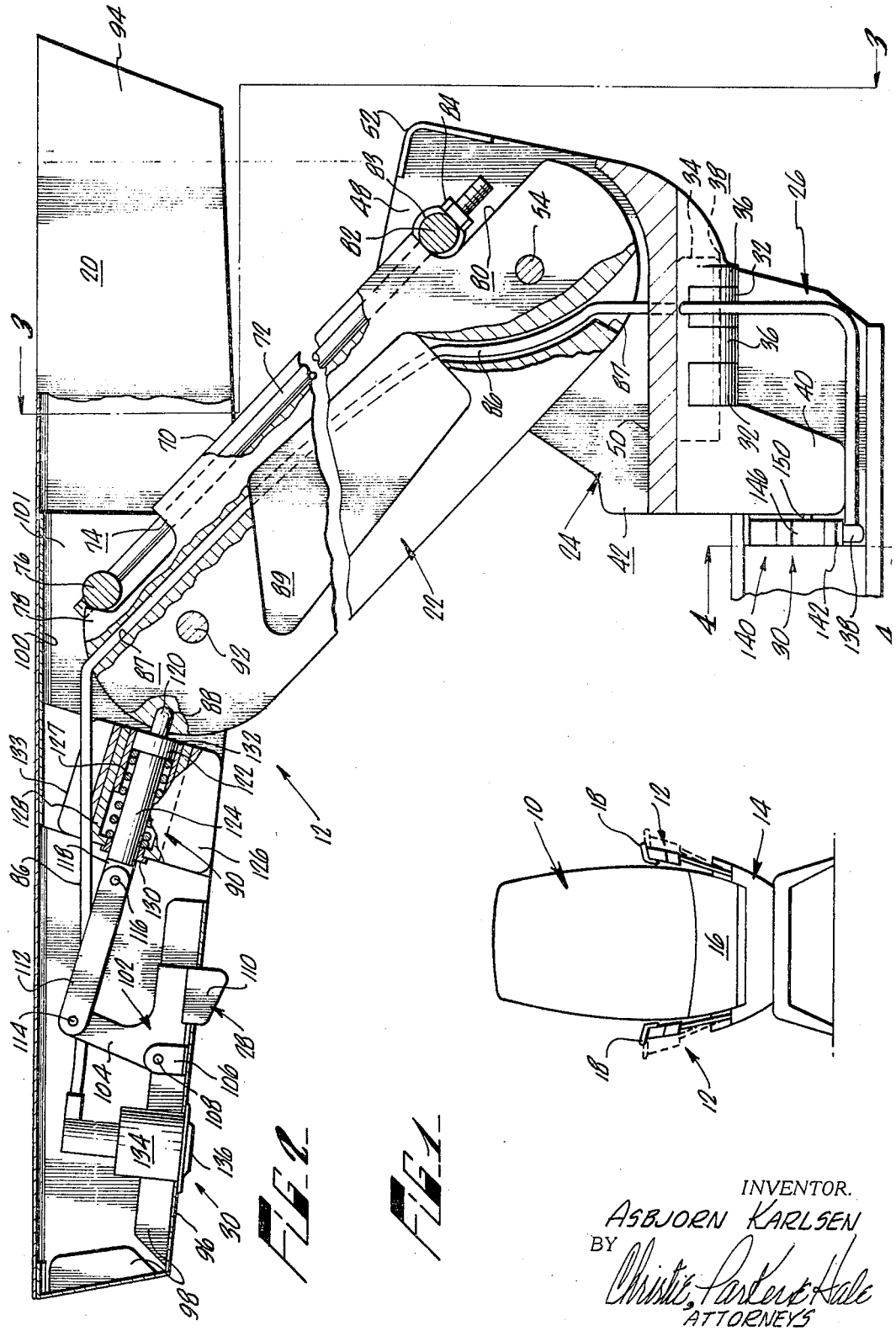
INVENTOR.
ASBJORN KARLSEN
BY
ATTORNEYS Jan. 13, 1970   A. KARLSEN   3,489,458
ARMREST ASSEMBLY
Filed June 21, 1968   2 Sheets-Sheet 2
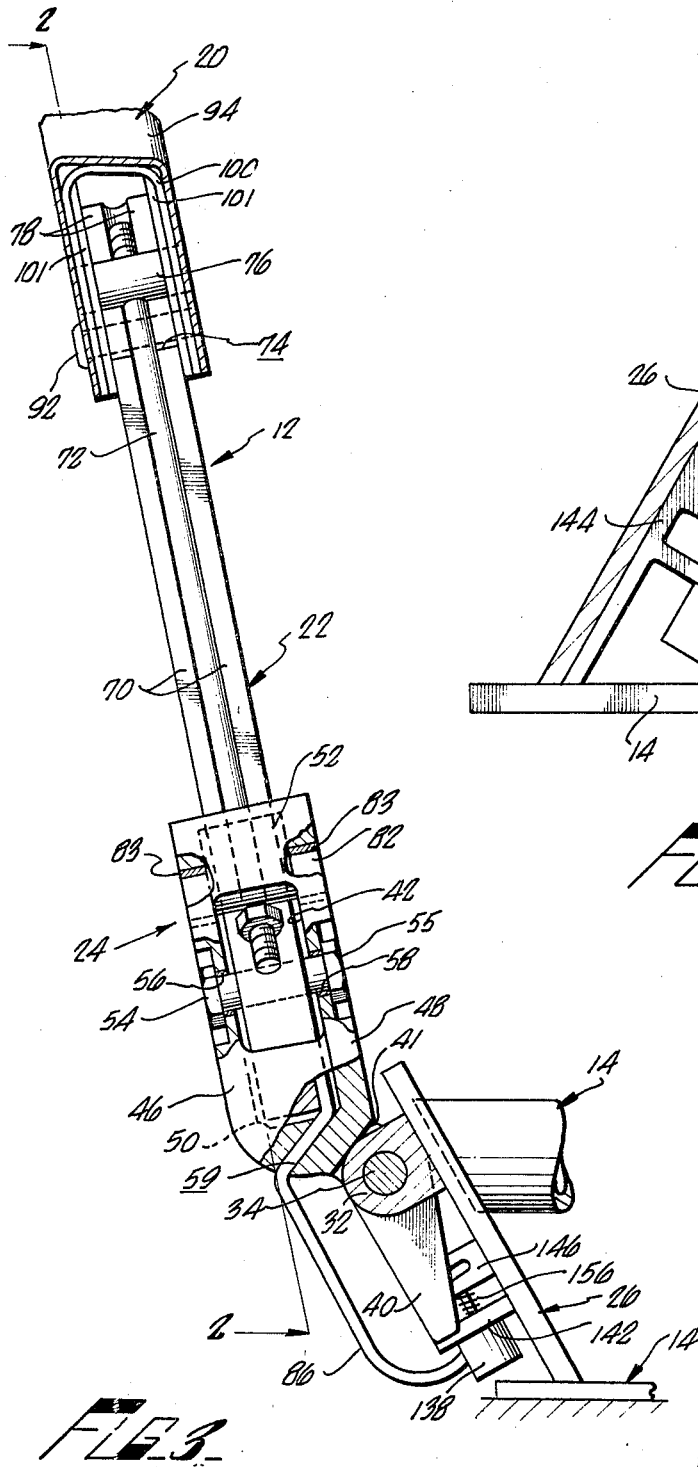
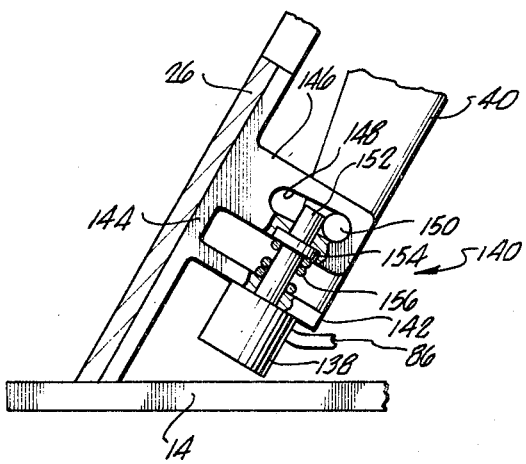
INVENTOR.
ASBJORN KARLSEN
BY Christie, Parker & Hale
ATTORNEYS.

United States Patent Office 3,489,458
Patented Jan. 13, 1970

3,489,458
ARMREST ASSEMBLY
Asbjorn Karlsen, Pacific Palisades, Calif., assignor to Hardman Aerospace, Los Angeles, Calif., a corporation of California
Filed June 21, 1968, Ser. No. 739,062
Int. Cl. A47c 7/54; B60n 1/06
U.S. Cl. 297—417                                      17 Claims

ABSTRACT OF THE DISCLOSURE

The improved armrest assembly is capable of passenger retraction to a position along the side of a seat's cushion and of adjustment laterally of the aircraft seat. The assembly includes an armrest pivotally secured to a strut which in turn is pivotally secured to a lower mounting bracket. A retractable shear pin assembly normally locks the armrest to the strut to prevent rotation of the armrest. A leveling rod is coupled to the armrest and through a keeper to the lower mounting bracket such that rotation of the strut and armrest is prevented unless the shear pin assembly is unlocked from the strut. When the shear pin assembly is retracted, the armrest and strut retract as a unit by rotation about the strut's pivot at the lower mounting bracket. The lower mounting bracket is movable laterally of the seat between an inner and an outer position. A releasable, fluid actuatable lock is provided to prevent movement of the mounting bracket and its carried strut and armrest from one lateral position to the other.

BACKGROUND OF THE INVENTION

The present invention relates in general to an armrest assembly and, in particular, to an armrest assembly which has the facility of retraction and lateral positioning.

Present day passenger seats are usually equipped with armrest assemblies which are marked by their lack of adaptability to various seating situations and passenger requirements. Most passenger seats are equipped with armrests which have an invariable, fixed position laterally of the seat. These fixed position armrests prevent the development of additional armrest-to-armrest distance to accommodate large passengers. The inability of most armrests to retract prevents the seating flexibility which could be present, for example, by retracting the armrest between the seats to present a continuous, couch-like seat.

Even with armrest assemblies which have a lateral positioning facility, only the armrests themselves and not their supporting structures are movable. Thus, the rump distance between armrests remains invariable regardless of armrest orientation. With the narrow seats often used in aircraft, for example, the constancy of rump distance between armrest assemblies can be very uncomfortable for large passengers.

Moreover, prior art armrest assemblies having a retractable feature require considerable space for the retraction mechanism if armrest stability is to be maintained against the heavy loads often imposed on them. One prior art method of retracting armrests, for example, employs parallel bars between the seat's frame and the armrest proper which may be locked in the armrest's erect position. These bars must be spaced relatively far apart if meaningful load stability is to be achieved. As a consequence, the forward parallel bar deprives a passenger of the space otherwise available under the forward portion of the armrest.

Therefore, there is a marked need for a strong armrest assembly which is capable of lateral positioning and retraction to develop variable rump distances without the utilization of excessive space under the forward part of the armrest.

SUMMARY OF THE INVENTION

The present invention provides an armrest assembly, especially suitable for aircraft, which is capable of retraction and lateral positioning of the entire assembly above a seat cushion of the seat used with the armrest without utilizing the space below the forward part of the armrest.

One form of the present invention contemplates an armrest assembly having a lower mounting bracket which is adapted for pivotal mounting to a seat between first and second lateral stop positions. The first stop position corresponds to an inner position of the armrest assembly wherein the assembly is relatively close to a seat. The second stop position corresponds to an outer lateral position of the armrest assembly which is relatively far from the seat to which the assembly is mounted. A strut is pivotally carried by the lower mounting bracket for movement between an erect position and a retracted position. An armrest proper is pivotally mounted to the strut for rotational movement with respect to the strut. A first lock means is operable to maintain the strut in its erect position and the armrest relatively horizontal. Second lock means is operable to maintain the lower bracket, and hence the entire armrest assembly, in either its first, inner position or its second, outer position. Means is provided to release the first lock means and to retract the strut and armrest. Second lock release means is provided to release the lock that maintains the armrest assembly in either its inner or outer position.

Preferably, the lock means which maintains the strut erect and the armrest relatively horizontal includes a leveling rod which acts in conjunction with the strut to prevent the strut's rotation toward its retracted position. The leveling rod is preferably roatably secured to the armrest at its upper end and rotatably and slidably secured to the lower mounting bracket at its lower end. The rotational pivotal coupling of the leveling rod with the armrest may be provided by a trunnion journaled in the armrest for slight rotation with respect thereto. The rotational, or pivotal, and slidable coupling of the leveling rod to the mounting bracket may be provided by a pin journaled in the mounting bracket and through which the leveling rod extends. Keeper means are provided to prevent the leveling rod from passing through the pin. The leveling rod is disposed generally parallel to but spaced from a line between the pivotal connections of the armrest to the strut and the strut to the lower mouning bracket. The keeper then prevents the leveling rod from pulling through its mounting pin at the lower mounting bracket. As such, the strut and its carried armrest are not capable of rotating from the erect position to the retracted position. Preferably, the strut has a channel for receiving the leveling rod and slots for the trunnion and the pin. These slots may define stops for preventing undesirable rotation of the armrest and strut.

Preferably, the first lock means also includes a shear pin assembly actuatable through a bellcrank assembly by a passenger. The shear pin assembly includes a pin which normally engages the strut to prevent rotation of the armrest with respect to the strut. When actuated, the shear pin assembly withdraws from this locking engagement with the strut to free the armrest from the strut and allow the leveling rod's keeper to move free of its restraining pin. After the keeper is freed, the armrest and strut may be rotated to their retracted position.

Preferred locking means for selectively maintaining the lower bracket in either its first or second lateral stop positions includes a boss having a slot in which a position member carried by the lower mounting bracket may move between positions corresponding to the first and second lateral stop positions of the armrest assembly. A blocking member, which is preferably actuated by a fluid cylinder, is disposed to block movement of the position member in the slot and thus to maintain the armrest assembly in either of its two lateral positions. The armrest assembly may be adapted with a fluid actuator button which pressurizes a fluid cylinder to withdraw the blocking member and free the position member. With the blocking member withdrawn, the arm may be positioned in either of its two lateral positions.

The present invention provides a retractable and laterally adjustable armrest assembly. The unique construction of the assembly frees the underside of the front part of the armrest from objectionable structure. The strut is laterally adjustable with the armrest to provide for greater or lesser rump space in a seat using the armrest assembly.

These, as well as other features, aspects and advantages of the present invention will become more apparent from the following description, appended claims and drawings.

BRIEF DESCRIPTION OF THE FIGURES

FIGURE 1 is a front elevational view of an aircraft seat equipped with a pair of the retractable, laterally positionable armrests of the present invention;

FIGURE 2 is a view, partly in section and broken away, of the preferred armrest construction of the present invention taken generally along line 2—2 of FIGURE 3;

FIGURE 3 is a rear elevational view, partly broken away, of the armrest shown in the previous figures, taken generally along line 3—3 of FIGURE 2, with the armrest slightly elevated; and FIGURE 4 is a fragmentary view taken along line 4—4 of FIGURE 2.

DESCRIPTION OF THE PREFERRED EMBODIMENT

FIGURE 1 illustrates an aircraft seat 10 equipped with a pair of retractable and laterally positionable armrest assemblies 12.

Armrest assemblies 12 are mounted on a base 14 of chair 10. In general, each of the armrest assemblies 12 is capable of passenger adjustment between an inner and an outer position. In addition, each of the armrest assemblies is manually actuatable to retract down along the side of a seat cushion 16 of chair 10. Each of the armrest assemblies has a cap 18 mounted thereon for the comfort of a passenger.

FIGURES 2 and 3 illustrate the preferred construction of an armrest assembly in detail. The construction described in detail with respect to one assembly is essentially identical to that of the complementary assembly.

In general, each armrest assembly 12 includes an armrest 20 pivotally mounted to a strut 22 which in turn is pivotally connected to a lower mounting bracket 24. Mounting bracket 24 is pivotally connected to a second mounting bracket 26 mounted on base 14 of aircraft seat 10.

A retraction and lock assembly 28 locks armrest 20 in a more or less horizontal attitude on strut 22. The retraction and lock assembly is also operable to release the arm and the strut for the retraction of armrest assembly 12 to the side of seat cushion 16.

A lateral positioning and lock assembly 30 provides for the lateral positioning of armrest assembly 12 between two positions. The first of these positions is inward of the aircraft seat 10 as shown by the solid lines in FIGURE 1. The second of these positions is relatively outward of the aircraft seat as shown by the phantom lines in FIGURE 1.

Mounting bracket 26 is mounted on base 14 and has a pair of bosses 32 for receiving a pivot pin 34. Mounting bracket 24 also has a pair of spaced-apart bosses 36 for receiving pivot pin 34 and to form, with the pivot pin and bosses 32, a laterally acting hinge. Pin 34 is received in a dead-end hole 38 in mounting bracket 24.

Mounting bracket 24 also has a lug 40 extending downwardly from the balance of the bracket. An angled surface 41 of bracket 24 abuts bosses 32 of mounting bracket 26, as shown in FIGURE 3, when armrest assembly 12 is in its inner position. The engagement of surface 41 with bosses 32 provides an inner stop for armrest assembly 12. The complementary outer stop is provided by lug 40 against bracket 26. Bosses 36 and lug 40 are offset laterally inward toward seat 10 from the remainder of the armrest assembly for the attachment of bracket 24 to mounting bracket 26 and base 14.

Bracket 24 has an internal recess 42 for rotational movement of strut 22 between its erected and retracted positions and for receiving the lower end of the strut. This recess is defined by a pair of spaced-apart flanges 46 and 48. A lower surface 50 of this recess joins the bottoms of flanges 46 and 48 and provides a stop for strut 22 in its retracted position. A protective web 52 bridges the flanges at their upper, exposed, rear corner to protect the interior recess and to strengthen bracket 24 against flexure loads from armrest 20.

Strut 22 is pivotally mounted within the recess by a bolt 54 secured by nut 55. Bolt 54 is received in flanges 46 and 48 in a pair of bushings 56 and 58. If desired, a bushing may be provided in strut 22 for receiving bolt 54. Flanges 46 and 48 are recessed to receive the head of bolt 54 and nut 55. A bore 59 provides for the passage of a hydraulic line of lateral positioning assembly 30 from recess 42 to the exterior of bracket 24.

Strut 22 connects armrest 20 to bracket 24. The strut has a channel portion 70 for receiving a leveling rod 72 of retraction and lock assembly 28 and for allowing the leveling rod to move slightly away from the strut when the armrest assembly is retracted. A slot 74 is provided at the upper rear end of strut 22 for limited movement of a trunnion 76 with respect to the strut. Trunnion 76 is journaled in armrest 20. As is illustrated in FIGURE 2, trunnion 76 rests against a rotation stop 78 of strut 22 at the upper end of slot 74 when armrest 20 is erected. Stop 78 when engaged by trunnion 76 prevents counterclockwise rotation of armrest 20 with respect to strut 22.

A lower slot or recess 80 of strut 22 provides an upper stop for a pin 82 of retraction and lock assembly 28. The pin is journaled in bushings 83, which in turn are disposed in flanges 46 and 48 of bracket 24, and extends across them. Leveling rod 72 extends through a hole in pin 82. A nut 84 acts as a keeper for leveling rod 72 to prevent it from passing up through pin 82. As such, the nut's bearing on pin 82 prevents the collapse of strut 22 toward its retracted position. The adjustment afforded by nut 84 on the threads of leveling rod 72 insures the registration of the lock pin of retraction and lock assembly 28 in a hole in strut 22. Pin 82 also prevents clockwise rotation of strut 22 by providing a stop for the upper portion of recess 80.

The construction of strut 22 provides for the passage of a hydraulic line 86 of lateral positioning assembly 30. For this purpose strut 22 has a recess 87 on its rear side for the hydraulic line. In addition, strut 22 may have an intermediate recess 89 which, together with a complementary recess on the opposite side of the strut, defines a web. The web construction lightens the armrest assembly. A dead-end hole 88 is provided for receiving the shear pin of a shear pin assembly 90 of retraction and lock assembly 28. Armrest 20 is pivotally mounted at the upper end of strut 22 through a pivot pin 92.

Armrest 20 is generally defined by an outer channel 94. Outer channel 94 has a generally horizontal top for cap 18 (see FIGURE 1) and sloping sides for the accomodation of angled strut 22. A channel bracket 96 closes the front of outside channel 94 and is secured thereto through tabs or ears 98. An interior channel 100 is provided for bearing and journal support of trunnion 76 and pivot pin 92. Interior channel 100 also provides a mount for the mounting bracket of shear pin assembly 90. A pair of washers 101 are disposed inside interior channel 100 against the sides of strut 22.

Trunnion 76 and pivot pin 92 are secured in outer channel 94 and receive bearing support from interior channel 100 and washers 101. Thus, the washers and interior channel provide stiffening for outer channel 94.

Retraction and lock assembly 28 generally includes a bellcrank assembly 102, trunnion 76, pin 82, leveling rod 72 and shear pin assembly 90. As was previously mentioned, leveling rod 72 is secured within trunnion 76 and trunnion 76 is carried by armrest 20. The lower end of leveling rod 72 carries nut 84. This nut bears against pin 82 to prevent counterclockwise rotation of armrest 20 and strut 22 about bolt 54. Pin 82 also prevents clockwise rotation of strut 22.

When bellcrank assembly 102 is actuated, the locking pin of shear pin assembly 90 withdraws from dead-end hole 88. Armrest 20 may then rotate clockwise with respect to strut 22 while strut 22 rotates counterclockwise to its retracted position. With this motion, trunnion 76 moves downwardly with respect to stop 78 and leveling rod 72, with nut 84, moves downwardly away from pin 82. The lower position of the armrest is determined by surface 50 of lower mounting bracket 24.

However, with the shear pin assembly engaged, arm 20 cannot rotate with respect to strut 22 because the locking pin of this assembly prevents such rotation. Strut 22 cannot rotate counterclockwise because it is rigidly coupled to armrest 20. As such, nut 84 prevents rotation of the strut and the armrest in this direction. The inability of armrest 20 and strut 22 to rotate counterclockwise as a unit until bellcrank assembly 102 is actuated, maintains the armrest assembly in its erect attitude. Clockwise rotation of armrest 20 and strut 22 is prevented by pin 82.

More specifically, bellcrank assembly 102 includes a bellcrank 104 which is pivotally mounted in a clevis 106. Clevis 106 is attached to channel bracket 96. A pivot pin 108 provides the pivotal connection. A button 110 extends through channel bracket 96 for passenger actuation of retraction and lock assembly 28. A link 112 is connected to the upper arm of bellcrank 104 through a pivot pin 114. Shear pin assembly 90 is attached to link 112 through a pivot pin 116. Link 112 has generally U-shaped ends for spanning an ear 118 of shear pin assembly 90 and the upper arm of bellcrank 104.

Shear pin assembly 90 includes a locking pin in the form of a shear pin 120 disposed for engagement in dead-end hole 88, an annular flange 122 and a shank 124. Ear 118 is integral with shank 124 which in turn is integral with flange 122 and shear pin 120. Shear pin assembly 90 is carried for limited translational movement in a mounting bracket 126. This bracket is attached to outside channel 94. A spring 127 biases the shear pin assembly into its engagement in dead-end hole 88. A generally cylindrical bushing 128 is disposed within mounting bracket 126. A guide bushing 130 is carried by bushing 128 for guiding shank 124. A third bushing 132 is disposed within housing 128 for receiving flange 122. Bracket 126 has a U-shaped guide portion 133 at its upper end for receiving hydraulic line 86.

Lateral positioning assembly 30 includes a hydraulic actuator button assembly 134 of standard construction. A button 136 of this assembly, when depressed, pressurizes line 86. As was previously mentioned, line 86 extends through strut 22. Line 86 also extends through bracket 24 for its terminus at a hydraulic cylinder 138. Hydraulic cylinder 138 forms a part of a lateral lock assembly 140.

Lateral lock assembly 140 (shown in FIGURE 4) includes a mounting lug 142 for hydraulic cylinder 138. A base 144 provides for the mounting of lock assembly 140 to bracket 26. A boss 146 extends from base 144. Boss 146 has a slot 148, the ends of which determine the lateral stop positions of armrest assembly 12. A position member in the form of a pin 150 extending from lug 40 of lower mounting bracket 24 is disposed in the slot for movement between its ends. The piston of hydraulic cylinder 138 is coupled to a blocking member in the form of a pin 152 which is normally disposed in a locking position within slot 148 to prevent pin 150 from moving.

Pin 152 has a flange 154 normally disposed in a receiving counterbore of boss 146. A spring 156 is disposed about pin 152 to urge the pin into slot 148. For this purpose, spring 156 is compresively engaged by lug 142 and spring 156. Pin 152 is supported against forces acting laterally of its axis imposed by pin 150 by lug 142 and boss 146.

Hydraulic cylinder 138 is of standard construction. The hydraulic cylinder is operable by the depression of button 136 to overcome the force of spring 156 to retract pin 152. With pin 152 retracted, movement of pin 150 within slot 148 is possible.

The operation of armrest assembly 12 will now be described.

If it is desired to retract armrest assembly 12, a passenger depresses button 110. The depression of button 110 causes bellcrank 104 to rotate counterclockwise. With this counterclockwise rotation, link 112 carries locking pin 120 of shear pin assembly 90, against the force of spring 127, out of engagement with strut 22. The strut is then unlocked from armrest 20. Armrest 20 is then free to rotate clockwise with respect to strut 22 about pivot pin 92. Strut 22 is also free to rotate counterclockwise about bolt 54. Trunnion 76 and its carried leveling rod 72 will move with the clockwise rotation of armrest 20 slightly outward and downward with respect to strut 22. Nut 84 at the lower end of leveling rod 72 will therefore develop a clearance from pin 82 as strut 22 and armrest 20 lower to their retracted position.

To raise armrest assembly 12, a passenger merely lifts arm 20 to carry it and strut 22 clockwise about bolt 54 while rotating arm 20 counterclockwise with respect to the strut. At its proper position, locking pin 120 will register with dead-end hole 88 and be forced into this hole by spring 127. This occurs when trunnion 76 and hence its carried leveling rod 72 are in proper orientation with respect to strut 22. With shear pin 120 engaged in hole 88, nut 84 bears against pin 82 to lock strut 22 and armrest 20 into the position illustrated in FIGURE 2.

When it is desired to laterally position the armrest assembly a passenger depresses button 136 to pressurize hydraulic line 86. With the pressurization of hydraulic line 86, hydraulic cylinder 138 retracts pin 152 to free pin 150 and, therefore, lug 40 and the balance of bracket 24 from mounting bracket 26. An operator may then move the armrest assembly laterally outward until pin 150 reaches the interior end of slot 148. To move the armrest back to its relatively vertical position, the same sequence is followed, except that the passenger pulls inwardly on armrest 20 while depressing button 136 to force pin 150 against the exterior end of slot 148.

What is claimed is:

1. An armrest assembly for an aircraft seat and the like comprising:
    (a) a lower mounting bracket adapted for pivotal mounting to a seat between first and second lateral stop positions, the first stop position being inward toward the seat and the second stop position being outward from the seat;
    (b) a strut pivotally carried by the lower mounting bracket between an erect position and a retracted position;
    (c) an armrest pivotally carried by the strut for movement therewith between the erect position and retracted position;
    (d) first lock means for maintaining the strut in its erect position and the armrest relatively horizontal;
    (e) second lock means for selectively maintaining the lower bracket in either its first or second stop positions;
(f) means to release the first lock means to lower the strut and its carried armrest to the retracted position; and
(g) means to release the second lock means to allow positioning of the lower mounting bracket in either its first or its second stop positions.

2. The armrest assembly claimed in claim 1 wherein the first lock means includes:
(a) a leveling rod disposed generally parallel to and spaced from an imaginary line between the pivotal connections of the strut to the lower mounting bracket and the armrest to the strut;
(b) upper mounting means pivotally securing the leveling rod to the armrest; and
(c) lower mounting means pivotally coupling the leveling rod to the lower mounting bracket such that the leveling rod is capable of linear movement with respect to the lower mounting means when the first lock release is actuated.

3. The armrest assembly claimed in claim 1 wherein:
(a) the upper mounting means includes a trunnion journaled in the armrest; and
(b) the lower mounting means includes a pin journaled in the lower mounting bracket, the leveling rod being slidably disposed in a hole in the pin, and keeper means at the lower end of the leveling rod disposed to prevent the leveling rod from pulling through the pin.

4. The armrest assembly claimed in claim 3 wherein: the armrest includes an outer channel for passenger arm support, an inner channel disposed within the outer channel and around the upper portion of the strut, and a pair of washers on either side of the strut and within the inner channel, the trunnion being journaled in the outer channel, inner channel and washers.

5. The armrest assembly claimed in claim 3 wherein: the first lock means includes passenger retractable pin means mounted in the armrest to lock the armrest to the strut.

6. The armrest assembly claimed in claim 5 wherein the first lock means includes:
(a) bellcrank means pivotally carried by the armrest and operatively coupled to the retraction pin means, the bellcrank means being operative by a passenger to retract the retractable pin means and unlock the armrest from the strut; and
(b) biasing means urging the retractable pin means into locking engagement with the strut.

7. The armrest assembly claimed in claim 6 wherein the strut includes:
(a) an upper slot receiving the trunnion;
(b) an upper stop above the trunnion disposed to engage the trunnion and prevent rotation of the front of the armrest toward the lower mounting bracket during retraction of the armrest assembly;
(c) a lower slot receiving the pin of the lower mounting means and operative to prevent rotation of the strut beyond its erect position by bearing against the slot's received pin; and
(d) a channel between the upper and lower stops, the leveling rod being received in the channel for movement therein during retraction and erection of the armrest assembly.

8. The armrest assembly claimed in claim 1 wherein the first lock means includes:
(a) a shear pin assembly mounted on the armrest disposed for retractable engagement of the strut;
(b) biasing means for biasing the shear pin assembly into locking engagement with the strut; and
(c) bellcrank means operative by a passenger to retract the shear pin means from the strut to unlock the armrest therefrom.

9. The armrest assembly claimed in claim 8 wherein the first lock means includes:
(a) a leveling rod spaced from and generally parallel to an imaginary line between the pivotal connections of the strut to the lower mounting bracket and the armrest to the strut;
(b) means for pivotally securing the leveling rod to the armrest;
(c) means pivotally securing the leveling rod to the lower mounting bracket such that the leveling rod is capable of linear movement with respect to the lower mounting bracket; and
(d) keeper means associated with the leveling rod and the lower mounting bracket for preventing the leveling rod, armrest and strut from rotating as a unit to the strut's retracted position until the shear pin assembly is retracted.

10. The armrest assembly claimed in claim 9 wherein:
(a) the leveling rod is pivotally mounted to the armrest by a trunnion journaled in the armrest; and
(b) the leveling rod is pivotally mounted to the lower mounting bracket through a pin journaled in the lower mounting bracket, the leveling rod being slidably disposed in a hole in the pin and the keeper means being operative to prevent the leveling rod from pulling through the pin.

11. The armrest assembly claimed in claim 1 wherein the second lock means includes:
(a) a locking assembly adapted for mounting on the seat, the locking assembly having first and second spaced-apart stop means corresponding to the lateral stop positions of the lower mounting bracket, a blocking member normally in position between the first and second stop means, and passenger actuable means to retract the blocking member from its normal position; and
(b) position means on the lower mounting bracket disposed for movement between the stop means of the locking assembly, the blocking member in its normal position blocking such movement.

12. The armrest assembly claimed in claim 11 wherein:
(a) the position means includes a position member carried by the lower mounting bracket; and
(b) the locking assembly includes:
(i) spring means urging the blocking member into its normal blocking position;
(ii) a fluid cylinder coupled to the blocking member for the retraction thereof from its normal position; and
(iii) means carried by the armrest for passenger actuation of the fluid cylinder.

13. The armrest assembly claimed in claim 12 wherein:
(a) the locking assembly includes:
(i) a boss having a slot, the ends of which define the first and second stop means, and a bore opening into the slot between its ends through one side of the boss,
(ii) a lug spaced from the boss having a bore axially aligned with the bore of the boss;
(b) the blocking member is disposed for movement in the bores of the lug and the boss.

14. The armrest assembly claimed in claim 13 wherein:
(a) the blocking member has an annular flange disposed for movement between the boss and the lug; and
(b) the spring means of the locking assembly urges against the annular flange and the lug to maintain the blocking member in its normal position.

15. The armrest assembly claimed in claim 11 wherein the first lock means includes:
(a) a leveling rod spaced from and generally parallel to an imaginary line between the pivotal connections of the strut to the lower mounting bracket and the armrest to the strut;
(b) means for pivotally securing the leveling rod to the armrest;

(c) means pivotally securing the leveling rod to the lower mounting bracket such that the leveling rod is capable of linear movement with respect to the lower mounting bracket; and (d) keeper means associated with the leveling rod and the lower mounting bracket for preventing the leveling rod, armrest and strut from rotating as a unit to the strut's retracted position until the shear pin assembly is retracted.

16. The armrest assembly claimed in claim 15 wherein the first lock means includes:

(a) a shear pin assembly mounted on the armrest disposed for retractable engagement of the strut;

(b) biasing means for biasing the shear pin assembly into locking engagement with the strut; and (c) bellcrank means operative by a passenger to retract the shear pin means from the strut to unlock the armrest therefrom.

17. The armrest assembly claimed in claim 16 wherein:

(a) the position means includes a position member carried by the lower mounting bracket; and (b) the locking assembly includes (i) spring means urging the blocking member into its normal blocking position;

(ii) a fluid cylinder coupled to the blocking member for the retraction thereof from its normal position; and (iii) means carried by the armrest for passenger actuation of the fluid cylinder.

References Cited

UNITED STATES PATENTS

| | | | |
|---|---|---|---|
| 2,955,648 | 10/1960 | Krajewski | 297—417 |
| 3,173,722 | 3/1965 | Carbonetti | 297—427 X |
| 3,322,463 | 5/1967 | Neale et al. | 297—417 |

CASMIR A. NUNBERG, Primary Examiner

U.S. Cl. X.R.

297—422